United States Patent Office 3,578,584
Patented May 11, 1971

3,578,584
HYDROCARBON CONVERSION PROCESS AND PLATINUM-GERMANIUM CATALYTIC COMPOSITE FOR USE THEREIN
John C. Hayes, Palatine, Ill., assignor to Universal Oil Products Company, Des Plaines, Ill.
No Drawing. Filed May 28, 1969, Ser. No. 828,762
Int. Cl. B01j *11/08;* C10g *35/08*
U.S. Cl. 208—139                                        20 Claims

ABSTRACT OF THE DISCLOSURE

A catalytic composite, comprising a combination of a platinum group component, a germanium component, and a halogen component with a porous carrier material in amounts sufficient to result in the composite containing, on an elemental basis, about 0.01 to about 2.0 wt. percent of the platinum group metal, about 0.01 to about 5.0 wt. percent germanium, and about 0.5 to about 3.5 wt. percent halogen, is disclosed. Key feature of the subject composite is the use of the germanium component, which is prepared and maintained in an oxidation state above that of the elemental metal, to promote the platinum group component. The principal utility of the subject composite is in the conversion of hydrocarbons, particularly in the reforming of a gasoline fraction. A specific example of the catalyst disclosed is a combination of platinum, germanium oxide, and chloride with an alumina carrier material in amounts sufficient to result in the composite containing, on an elemental basis, about 0.05 to about 1.0 wt. percent platinum, about 0.05 to about 2.0 wt. percent germanium, and about 0.6 to about 1.2 wt. percent chlorine.

---

The subject of the present invention is a novel catalytic composite which has exceptional activity, selectivity, and resistance to deactivation when employed in a hydrocarbon conversion process that requires a catalyst having both a hydrogenation-dehydrogenation function and an acid function. More precisely, the present invention involves a novel dual-function catalytic composite which, quite surprisingly, enables substantial improvements in hydrocarbon conversion processes that have traditionally utilized a dual-function catalyst to accelerate the various hydrocarbon conversion reactions associated therewith. In another aspect, the invention concerns the improved processes that are produced by the use of a catalytic composite comprising a combination of a platinum group component, a germanium oxide component, and a halogen component with a porous, high-surface area carrier material; specifically, an improved reforming process which utilizes the subject catalyst to markedly improve activity, selectivity, and stability characteristics associated therewith, to increase yields of $C_5+$ reformate and of hydrogen and to allow operation at high severity conditions not heretofore generally employed in the art of continuous reforming processes.

Composites having a hydrogenation-dehydrogenation function and a cracking function are widely used today as catalysts in many industries, such as the petroleum and petrochemical industry, to accelerate a wide spectrum of hydrocarbon conversion reactions. Generally, the cracking function is thought to be associated with an acid-acting material of the porous, adsorptive, refractory oxide type which is typically utilized as the support or carrier for a heavy metal component such as the metals or compounds of metals of Group V through VIII of the Periodic Table to which are generally attributed the hydrogenation-dehydrogenation function.

These catalytic composites are used to accelerate a wide variety of hydrocarbon conversion reactions such as hydrocracking, isomerization, dehydrogenation, hydrogenation, desulfurization, cyclization, alkylation, polymerization, cracking hydroisomerization, etc. In many cases, the commercial applications of these catalysts are in processes where more than one of these reactions are proceeding simultaneously. An example of this type of process is reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking of naphthenes and paraffins and the like reactions to produce an octane-rich or aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is an isomerization process wherein a hydrocarbon fraction which is relatively rich in straight-chain paraffin components is contacted with a dual-function catalyst to produce an output stream rich in isoparaffin compounds.

Regardless of the reaction involved or the particular process involved, it is of critical importance that the dual-function catalyst exhibit not only the capability to initially perform its specified functions, but also that it has the capability to perform them satisfactorily for prolonged periods of time. The analytical terms used in the art to measure how well a particular catalyst performs its intended functions in a particular hydrocarbon reaction environment are activity, selectivity, and stability. And for purposes of discussion here, these terms are conveniently defined for a given charge stock as follows: (1) activity is a measure of the catalyst's ability to convert hydrocarbon reactants into products at a specified severity level where severity level means the conditions used—that is, the temperature, pressure, contact time, and presence of diluents such as $H_2$; (2) selectivity refers to the amount of desired product or products obtained relative to the amount of reactants converted; (3) stability refers to the rate of change with time of the activity and selectivity parameters—obviously the smaller rate implying the more stable catalyst. In a reforming process, for example, activity commonly refers to the amount of conversion that takes place for a given charge stock at a specified severity level and is typically measured by octane number of the $C_5+$ product stream; selectivity usually refers to the relative amount of $C_5+$ yield that is obtained at the particular severity level; and stability is typically equated to the rate of change with time of activity, as measured by octane number of $C_5+$ product and of selectivity, as measured by $C_5+$ yield. Actually, the last statement is not strictly correct because generally a continuous reforming process is run to produce a constant octane $C_5+$ product with a severity level being continuously adjusted to attain this result; and, furthermore, the severity level is for this process usually varied by adjusting the conversion temperature in the reaction zone so that in point of fact, the rate of change of activity finds response in the rate of change of conversion temperatures and changes in this last parameter are customarily taken as indicative of activity stability.

As is well known to those skilled in the art, the principal cause of observed deactivation or instability of a dual-function catalyst when it is used in a hydrocarbon conversion reaction is associated with the fact that coke forms on the surface of the catalyst during the course of the reaction. More specifically, in these hydrocarbon conversion processes, the conditions utilized typically result in the formation of heavy, high molecular weight, black, solid or semi-solid, carbonaceous material which coats the surface of the catalyst and reduces its activity by shielding its active sites from the reactants. In other words, the performance of this dual-function catalyst is sensitive to the presence of carbonaceous deposits on the surface of the catalyst. Accordingly, the major problem facing workers in this area of the art is the development of more active and selective catalytic composites that are not as sensitive to the presence of these carbonaceous materials and/or have the capability to suppress the rate of the formation of these carbonaceous materials on the catalyst. Viewed in terms of performance parameters, the problem is to develop a dual-function catalyst having superior activity, selectivity, and stability. In particular, for a reforming process the problem is typically expressed in terms of shifting and stabilizing the $C_5+$ yield-octane relationship—$C_5+$ yield being representative of selectivity, and octane being proportional to activity.

I have now found a dual-function catalytic composite which possesses improved activity, selectivity, and stability when it is employed in a process for the conversion of hydrocarbons of the type which have heretofore utilized dual-function catalytic composites such as processes for isomerization, hydroisomerization, dehydrogenation, desulfurization, denitrogenization, hydrogenation, alkylation, dealkylation, disproportionation, oligomerization, hydrodealkylation, transalkylation, cyclization, dehydrocyclization, cracking, hydrocracking, reforming, and the like processes. In particular, I have found that a catalyst, comprising a combination of a platinum group component, a germanium component, and a halogen component with a porous refractory carrier material, can enable the performance of a hydrocarbon conversion process utilizing a dual-function catalyst to be substantially improved. An essential condition associated with the acquisition of this improved performance is the oxidation state of the germanium component utilized in this catalyst. As a result of my investigations, I have determined that the germanium component must be utilized in a positive oxidation state (i.e., either $+2$ or $+4$) and that the germanium component must be uniformly distributed throughout the porous carrier material. In addition, I have found that in order to achieve the desired oxidation state and the distribution of the germanium component, the presence of a halogen component in the composite is essential. Furthermore, the catalyst must be prepared under carefully controlled conditions as will be explained hereinafter. In the case of a reforming process, one of the principal advantages associated with the use of the novel catalyst of the present invention involves the acquisition of the capability to operate in a stable manner in a high-severity operation; for example, a continuous reforming process producing a $C_5+$ reformate having an octane of about 100 F-1 clear and utilizing a relatively low pressure selected from the range of about 50 to about 350 p.s.i.g. In short, the present invention essentially involves the finding that the addition of a controlled amount of an oxidized germanium component to a dual-function hydrocarbon conversion catalyst containing a platinum group component and a halogen component enables performance characteristics of the catalyst to be sharply and materially improved.

It is, accordingly, one object of the present invention to provide a hydrocarbon conversion catalyst having superior performance characteristics when utilized in a hydrocarbon conversion process. A second object is to provide a catalyst having dual-function hydrocarbon conversion performance characteristics that are relatively insensitive to the deposition of hydrocarbonaceous material thereon. A third object is to provide preferred methods of preparation of this catalytic composite which insures the achievement and maintenance of its properties. Another object is to provide an improved reforming catalyst having superior activity, selectivity, and stability when employed in a low pressure reforming process. Yet another object is to provide a dual-function hydrocarbon conversion catalyst which utilizes a relatively inexpensive component, germanium, to promote a platinum metal component. Still another object is to provide a method of preparation of a germanium-platinum catalyst which insures the germanium component is in a highly dispersed oxidized state during use in the conversion of hydrocarbons.

In one embodiment, the present invention is a catalytic composite comprising a combination of a platinum group component, a germanium component, and a halogen component with a porous carrier material wherein the germanium component is present in an oxidation state above that of the elemental metal—typically, as germanium oxide. The porous carrier material is usually a porous, refractory, inorganic oxide, such as alumina, and the platinum group component and germanium component are usually utilized in relatively small amounts which are effected to promote the desired hydrocarbon conversion reaction.

A second embodiment relates to a catalyst composite comprising a combination of a platinum component, a germanium oxide component, and a halogen component with an alumina carrier material. These components are preferably combined in amounts sufficient to result in the final composite containing, on an elemental basis, about 0.01 to about 2.0 wt. percent platinum, about 0.01 to about 5.0 wt. percent germanium and about 0.5 to about 3.5 wt. percent halogen.

A third embodiment relates to the catalytic composite described in the second embodiment wherein the composite, prior to the use thereof in the conversion of hydrocarbons, is reduced with substantially water-free hydrogen under conditions selected to reduce the platinum component but not the germanium oxide component.

A fourth embodiment relates to a catalytic composite comprising a combination of the pre-reduced catalytic composite of the third embodiment with a sulfur component in an amount sufficient to incorporate about 0.05 to about 0.5 wt. percent sulfur, calculated on an elemental basis.

Another embodiment relates to a process for the conversion of a hydrocarbon comprising contacting the hydrocarbon with the catalytic composite of the first embodiment at hydrocarbon conversion conditions.

A preferred embodiment relates to a process for reforming a gasoline fraction which comprises contacting the gasoline fraction and hydrogen with the catalytic composite described above in the second embodiment at reforming conditions selected to produce a high-octane reformate.

Other objects and embodiments of the present invention relates to additional details regarding preferred catalytic ingredients, concentration of components in the catalyst composite, suitable methods of composite preparation, operating conditions for use in the hydrocarbon conversion processes, and the like particulars which are hereinafter given in the following detailed discussion of each of these facets of the present invention.

As indicated above, the catalyst of the present invention comprises a porous carrier material or support having combined therewith a platinum group component, a germanium component, and a halogen component. Considering first the porous carrier material utilized in the present invention, it is preferred that the material be a porous, adsorptive, high-surface area support having a surface area of about 25 to about 500 m.$^2$/gm. The porous carrier material should be relatively refractory to the conditions utilized in the hydrocarbon conversion process, and it is intended to include within the scope of the present invention carrier materials which have traditionally been utilized in dual-function hydrocarbon conversion catalysts such as: (1) activated carbon, coke, or charcoal; (2) silica or silica gel, clays and silicates including those synthetically prepared and naturally occurring, which may or may not be acid treated, for example, Attapulgus clay, China clay, diatomaceous earth, fuller's earth, kaolin, kieselguhr, pumice, etc.; (3) ceramics, porcelain, crushed firebrick, and bauxite; (4) refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica-zirconia, etc.; (5) crystalline aluminosilicates such as naturally occurring or synthetically prepared mordenite and/or faujasite, either in the hydrogen form or in a form which has been treated with multivalent cations; and, (6) combinations of these groups. The preferred porous carrier materials for use in the present invention are refractory inorganic oxides with best results obtained with an alumina carrier material. Suitable alumina materials are the crystalline aluminas known as the gamma-, eta-, and theta-alumina with gamma- or eta-alumina giving best results. In addition, in some embodiments the alumina carrier material may contain minor proportions of other well known refractory inorganic oxides such as silica, zirconia, magnesia, etc.; however, the preferred carrier material is substantially pure gamma- or eta-alumina. Preferred carrier materials have an apparent bulk density of about 0.30 to about 0.70 gm./cc. and surface area characteristics such that the average pore diameter is about 20 to 300 angstroms, the pore volume is about 0.10 to about 1.0 ml./gm. and the surface area is about 100 to about 500 m.$^2$/gm. In general, best results are typically obtained with a gamma-alumina carrier material which is used in the form of spherical particles having: a relatively small diameter (i.e., typically about 1/16 inch), an apparent bulk density of about 0.5 gm./cc., a pore volume of about 0.4 ml./gm., and a surface area of about 175 m.$^2$/gm.

The preferred alumina carrier material may be prepared in any suitable manner and may be synthetically prepared or natural occurring. Whatever type of alumina is employed it may be activated prior to use by one or more treatments including drying, calcination, steaming, etc., and it may be in a form known as activated alumina, activated alumina of commerce, porous alumina, alumina gel, etc. For example, the alumina carrier may be prepared by adding a suitable alkaline reagent, such as ammonium hydroxide, to a salt of aluminum such as aluminum chloride, aluminum nitrate, etc., in an amount to form an aluminum hydroxide gel which upon drying and calcining is converted to alumina. The alumina may be formed in any desired shape such as spheres, pills, cakes, extrudates, powders, granules, etc. and utilized in any desired size. For the purpose of the present invention, a particularly preferred form of alumina is the sphere; and alumina spheres may be continuously manufactured by the well known oil drop method which comprises: forming an alumina hydrosol by any of the techniques taught in the art and preferably by reacting aluminum metal with hydrochloric acid, combining the hydrosol with a suitable gelling agent and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300° F. to about 400° F. and subjected to a calcination procedure at a temperature of about 850° F. to about 1300° F. for a period of about 1 to about 20 hours. This treatment effects conversion of the alumina hydrogel to the corresponding crystalline gamma-alumina. See the teachings of U.S. Pat. No. 2,620,314 for additional details.

One essential constituent of the composite of the present invention is a germanium component, and it is an essential feature of the present invention that the germanium component is present in the composite in an oxidation state above that of the elemental metal. That is to say, the germanium component will exist in the catalytic composite in either the +2 or +4 oxidation state with the latter being the most likely state. Accordingly, the germanium component will be present in the composite as a chemical compound, such as the oxide, sulfide, halide, etc., wherein the germanium is in the required oxidation state, or as a chemical combination with the carrier material in which combination the germanium exists in this higher oxidation state. On the basis of the evidence currently available, it is believed that germanium component in the subject composite exists as germanous or germanic oxide. It is important to note that this limitation on the state of the germanium component requires extreme care in the preparation and use of the subject composite in order to insure that it is not subjected to high temperature reduction conditions effective to produce the germanium metal. This germanium component may be incorporated in the catalytic composite in any suitable manner known to the art such as by coprecipitation or cogellation with the porous carrier material, ion exchange with the gelled carrier material or impregnation with the carrier material either after or before it is dried and calcined. It is to be noted that it is intended to include within the scope of the present invention all conventional methods for incorporating a metallic composite in a catalytic composite and the particular method of incorporation used is not deemed to be an essential feature of the present invention. One method of incorporating the germanium component into the catalytic composite involves coprecipitating the germanium component during the preparation of the preferred carrier material, alumina. This method typically involves the addition of a suitable soluble germanium compound such as germanium tetrachloride to the alumina hydrosol and then combining the hydrosol with a suitable gelling agent and dropping the resulting mixture into an oil bath, etc., as explained in detail hereinbefore. After drying and calcining the resulting gelled carrier material there is obtained an intimate combination of alumina and germanium oxide. A preferred method of incorporating the germanium component into the catalytic composite involves utilization of a soluble, decomposable compound of germanium to impregnate the porous carrier material. In general, the solvent used in this impregnation step is selected on the basis of the capability to dissolve the desired germanium compound and is preferably an aqueous, acidic solution. Thus, the germanium component may be added to the carrier material by commingling the latter with an aqueous, acidic solution of suitable germanium salt or suitable compound or germanium such as germanium tetrachloride, germanium difluoride, germanium tetrafluoride, germanium di-iodide, germanium monosulfide, and the like compounds. A particularly preferred impregnation solution comprises germanium mono-oxide dissolved in chlorine water. In general, the germanium component can be impregnated either prior to, simultaneously with, or after the platinum group component is added to the carrier material. However, I have found that excellent results are obtained when the germanium component is impregnated simultaneously with the platinum group component. In fact, I have determined that a preferred impregnation solution contains chloroplatinic acid, hydrogen chloride, and germanous oxide dissolved in chlorine water. Following the impregnation step, the resulting composite is dried and calcined as explained hereinafter.

Regardless of which germanium compound is used in the preferred impregnation step, it is important that the germanium component be uniformly distributed throughout the carrier material. In order to achieve this objective it is necessary to maintain the pH of the impregnation solution in a range of about 1 to about 7 and to dilute the impregnation solution to a volume which is substantially in excess of the volume of the carrier material which is impregnated. It is preferred to use a volume ratio of impregnation solution to carrier material of at least 1.5:1 and preferably about 2:1 to about 10:1 or more. Similarly, it is preferred to use a relatively long contact time during the impregnation step ranging from about ¼ hour up to about ½ hour or more before drying to remove excess solvent in order to insure a high dispersion of the germanium component on the carrier material. The carrier material is, likewise, preferably constantly agitated during this preferred impregnation step.

As indicated above, the catalyst of the present invention also contains a platinum group component. Although the process of the present invention is specifically directed to the use of a catalytic composite containing platinum, it is intended to include other platinum group metals such as palladium, rhodium, ruthenium, osmium, and iridium. The platinum group component, such as platinum, may exist within the final catalytic composite as a compound such as an oxide, sulfide, halide, etc., or as an elemental metal. Generally, the amount of the platinum group component present in the final catalyst composite is small compared to the quantities of the other components combined therewith. In fact, the platinum group component generally comprises about 0.01 to about 2.0 wt. percent of the final catalytic composite, calculated on an elemental basis. Excellent results are obtained when the catalyst contains about 0.05 to about 1.0 wt. percent of the platinum group metal. The preferred platinum group component is platinum or a compound of platinum.

The platinum group component may be incorporated in the catalytic composite in any suitable manner such as coprecipitation or cogellation with the preferred carrier material, or ion exchange or impregnation thereof. The preferred method of preparing the catalyst involves the utilization of a water-soluble, decomposable compound of a platinum group metal to impregnate the carrier material. Thus, the platinum group component may be added to the support by commingling the latter with an aqueous solution of chloroplatinic acid. Other water-soluble compounds of platinum may be employed in impregnation solutions and include ammonium chloroplatinate, bromoplatinic acid, platinum dichloride, platinum tetrachlorde hydrate, platinum dichlorocarbonyl-clichloride, dinitro diaminoplatinum, etc. The utilization of a platinum chloride compound such as chloroplatinic acid is preferred since it facilitates the incorporation of both the platinum component and at least a minor quantity of the halogen component in a single step. Hydrogen chloride is also generally added to the impregnation solution in order to further facilitate the incorporation of the halogen component and to aid in the distribution of the metallic component throughout the carrier material. In addition, it is generally preferred to impregnate the carrier material after it has been calcined in order to minimize the risk of washing away the valuable platinum metal compounds; however, in some cases it may be advantageous to impregnate the carrier material when it is in a gelled state. Following the impregnation, the resulting impregnated support is dried and subjected to a high temperature calcination or oxidation technique which is explained hereinafter.

Another essential constituent of the subject composite is the halogen component. Although the precise form of the chemistry of the association of the halogen component with the carrier material is not entirely known, it is customary in the art to refer to the halogen component as being combined with the carrier material or with the other ingredients of the catalyst. This combined halogen may be either fluorine, chlorine, iodine, bromine, or mixtures thereof. Of these, fluorine and particularly chlorine are preferred. The halogen may be added to the carrier material in any suitable manner either during preparation of the carrier material or before or after the addition of the other components. For example, the halogen may be added at any stage of the preparation of the carrier material or to the calcined carrier material as an aqueous solution of an acid such as hydrogen fluoride, hydrogen chloride, hydrogen bromide, etc. The halogen component or a portion thereof may be composited with the carrier material during the impregnation of the latter with the platinum group component; for example, through the utilization of a mixture of chloroplatinic acid and hydrogen chloride. In another situation, the alumina hydrosol which is typically utilized to form the preferred alumina carrier material may contain halogen and thus contribute at least a portion of the halogen component to the final composite. For reforming, the halogen is combined with the carrier material in an amount sufficient to result in a final composite that contains about 0.5 to about 3.5 wt. percent and preferably about 0.6 to about 1.2 by weight of the halogen calculated on an elemental basis. In isomerization or hydrocracking embodiments, it is generally preferred to utilize relatively larger amounts of halogen in the catalyst—typically ranging up to about 10 wt. percent halogen calculated on an elemental basis, and, more preferably, about 1.0 to about 5.0 wt. percent. In a reforming embodiment, the preferred halogen component is chlorine or a compound thereof.

The halogen component is utilized in the subject composite for two purposes: one involves the traditional enhancement of the acidic function of the resulting composite, the other involves the achievement and maintenance of a uniform distribution of the oxidized germanium component in the carirer material. I have observed that a high dispersion of small crystallites of the germanium component in the carrier material is essential for the maintenance of the germanium component in an oxidized state under the reduction conditions used in the hereinafter described reduction step as well as the reduction conditions encountered in the use of the composite in, for example, a reforming process. One of the principal effects of incorporating the halogen component in the composite is that it acts to hold or fix the germanium component in a highly dispersed state where it highly resistant to the subsequent reduction conditions. Despite this resistance, it is still necessary to carefully control the conditions to which the composite is subjected in order to insure that the germanium is maintained in an oxidized state; that is to say, prolonged exposure of the composite to hydrogen at temperatures substantially above about 1000° F. are to be avoided.

Relative to the amount of the germanium component contained in the composite, it is preferably sufficient to constitute about 0.01 to about 5.0 wt. percent of the final composite, calculated on an elemental basis, although substantially higher amounts of germanium may be utilized in some cases. In a reforming embodiment best results are typically obtained with about 0.05 to about 2.0 wt. percent germanium. In the case where the germanium component is incorporated in the catalyst by coprecipitating it with the preferred alumina carrier material, it is within the scope of the present invention to prepare composites containing up to 30 wt. percent germanium, calculated on an elemental baiss. Regardless of the absolute amounts of the germanium component and the platinum group component utilized, the atomic ratio of germanium to the platinum group metal contained in the catalyst is preferably selected from the range of about 0.1:1 to about 5:1 with best results achieved at an atomic ratio of about 0.2:1 to 3.5:1. This is particularly true when the total content of the germanium component plus the platinum group component in the catalytic composite is fixed in the range of about 0.1 to about 3.0 wt. percent thereof, calculated on an elemental germanium and platinum group metal basis. Accordingly, examples of especially preferred catalytic composites are as follows: (1) a catalytic composite comprising 0.5 wt. percent germanium, 0.75 wt. percent platinum, and 0.6 to 1.2 wt. percent halogen combined with an alumina carrier material, (2) a catalytic composite comprising 0.1 wt. percent germanium, 0.65 wt. percent platinum, and 0.6 to 1.2 wt. percent halogen combined with an alumina carrier material, (3) a catalytic composite comprising 0.375 wt. percent germanium, 0.375 wt. percent platinum, and 0.6 to 1.2 wt. percent halogen combined with an alumina carrier material, (4) a catalytic composite comprising 1.0 wt. percent germanium, 0.5 wt. percent platinum, and 0.6 to 1.2 wt. percent halogen combined with an alumina carrier material, (5) a catalytic composite comprising 0.25 wt. percent germanium, 0.375 wt. percent platinum, and 0.6 to 1.2 wt. percent halogen combined with an alumina carrier material, (6) a catalytic composite comprising 0.8 wt. percent germanium, 0.375 wt. percent platinum, and 0.6 to 1.2 wt. percent halogen combined with an alumina carrier material, and, (7) a catalytic composite comprising 0.5 wt. percent germanium, 0.375 wt. percent platinum, and 0.6 to 1.2 wt. percent halogen combined with an alumina carrier material.

Regardless of the details of how the components of the catalyst are combined with the porous carrier material, the final catalyst generally will be dried at a temperature of about 200 to about 600° F. for a period of from about 2 to about 24 hours or more, and finally calcined at a temperature of about 700° F. to about 1100° F. in an air atmosphere for a period of about 0.5 to about 10 hours in order to convert the metallic components substantially to the oxide form. Best results are generally obtained when the halogen content of the catalyst is adjusted during the calcination step by including a halogen or a halogen-containing compound in the air atmosphere utilized. In particular, when the halogen component of the catalyst is chlorine, it is preferred to use a mole ratio of $H_2O$ to HCl of about 20:1 to about 100:1 during at least a portion of the calcination step in order to adjust the final chlorine content of the catalyst to a range of about 0.6 to about 1.2 wt. percent.

It is preferred that the resultant calcined catalytic composite be subjected to a substantially water-free reduction step prior to its use in the conversion of hydrocarbons. This step is desired to insure a uniform and finely divided dispersion of the metallic component throughout the carrier material. Preferably, substantially pure and dry hydrogen (i.e., less than 20 vol. p.p.m. $H_2O$) is used as the reducing agent in this step. The reducing agent is contacted with the calcined catalyst at conditions including a temperature of about 800° F. to about 1000° F. selected to reduce the platinum group component to the metallic state while maintaining the germanium component in an oxidized state. This reduction step may be performed in situ as part of a start-up sequence if precautions are taken to predry the plant to a substantially water-free state and if substantially water-free hydrogen is used. In order to minimize the danger of reducing the germanium component during this step, the duration of this step is preferably less than two hours, and, more typically, about one hour.

The resulting reduced catalytic composite may, in some cases, be beneficially subjected to a presulfiding step designed to incorporate in the catalytic composite from about 0.05 to about 0.50 wt. percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 50° F. up to about 1000° F. It is generally a good practice to perform this presulfiding step under substantially water-free conditions.

According to the present invention, a hydrocarbon charge stock and hydrogen are contacted with a catalyst of the type described above in a hydrocarbon conversion zone. This contacting may be accomplished by using the catalyst in a fixed bed system, a moving bed system, a fluidized bed system, or in a batch type operation; however, in view of the danger of attrition losses of the valuable catalyst and of well known operational advantages, it is preferred to use a fixed bed system. In this system, a hydrogen-rich gas and the charge stock are preheated by any suitable heating means to the desired reaction temperature and then are passed into a conversion zone containing a fixed bed of the catalyst type previously characterized. It is, of course, understood that the conversion zone may be one or more separate reactors with suitable means therebetween to insure that the desired conversion temperature is maintained at the entrance to each reactor. It is also to be noted that the reactants may be contacted with the catalyst bed in either upward, downward, or radial flow fashion with the latter being preferred. In addition, it is to be noted that the reactants may be in a liquid phase, a mixed liquid-vapor phase, or a vapor phase when they contact the catalyst, with best results obtained in the vapor phase.

In the case where the catalyst of the present invention is used in a reforming operation, the reforming system will comprise a reforming zone containing a fixed bed of the catalyst type previously characterized. This reforming zone may be one or more separate reactors with suitable heating means therebetween to compensate for the endothermic nature of the reactions that take place in each catalyst bed. The hydrocarbon feed stream that is charged to this reforming system will comprise hydrocarbon fractions containing naphthenes and paraffins that boil within the gasoline range. The preferred charge stocks are those consisting essentially of naphthenes and paraffins, although in many cases aromatics are also present. This preferred class includes straight run gasolines, natural gasolines, synthetic gasolines, and the like. On the other hand, it is frequently advantageous to charge thermally or catalytically cracked gasolines or higher boiling fractions thereof. Mixtures of straight run and cracked gasolines can also be used to advantage. The gasoline charge stock may be a full boiling gasoline having an initial boiling point of from about 50° F. to about 150° F. and an end boiling point within the range of from about 325° F. to about 425° F., or may be a selected fraction thereof which generally will be a higher boiling fraction commonly referred to as a heavy naphtha—for example, a naphtha boiling in the range of $C_7$ to 400° F. In some cases, it is also advantageous to charge pure hydrocarbons or mixture of hydrocarbons that have been extracted from hydrocarbon distillates—for example, straight chain paraffins which are to be converted to aromatics. It is preferred that these charge stocks be treated by conventional catalytic pretreatment methods such as hydrorefining, hydrotreating, hydrodesulfurization, etc., to remove substantially all sulfurous, nitrogenous, and water-yielding contaminants therefrom, and to saturate any olefins that may be contained therein.

In other hydrocarbon conversion embodiments, the charge stock will be of the conventional type customarily used for the particular kind of hydrocarbon conversion being effected. For example, in typical isomerization embodiments the charge stock can be a paraffinic stock rich in $C_4$ to $C_8$ normal paraffins, or a normal butane-rich stock, or an n-hexane-rich stock, or a mixture of alkyl-aromatics such as a mixture of xylenes, etc. In hydrocracking embodiments the charge stock will be typically a gas oil, heavy cracked cycle oil, etc. Likewise, pure hydrocarbons or substantially pure hydrocarbons can be converted to more valuable products by using the catalyst of the present invention in any of the hydrocarbon conversion processes known to the art that use a dual-function catalyst.

In a reforming embodiment, it is generally preferred that the novel catalytic composite is utilized in a substantially water-free environment. Essential to the achievement of this condition in the reforming zone is the control of the water level present in the charge stock and the hydrogen stream which is being charged to the zone. Best results are ordinarily obtained when the total amount of water entering the conversion zone from any source is held to a level less than 50 p.p.m. and preferably less than 20 p.p.m., expressed as weight of equivalent water in the charge stock. In general, this can be accomplished by careful control of the water present in the charge stock and in the hydrogen stream; the charge stock can be dried by using any suitable drying means known to the art such as a conventional solid adsorbent having a high selectivity for water; for instance, sodium or calcium crystalline aluminosilicates, silica gel, activated alumina, molecular sieves, anhydrous calcium sulfate, high surface area sodium, and the like adsorbents. Similarly, the water content of the charge stock may be adjusted by suitable stripping operations in a fractionation column or like device. And in some cases, a combination of adsorbent drying and distillation drying may be used advantageously to effect almost complete removal of water from the charge stock. Preferably, the charge stock is dried to a level corresponding to less than 20 p.p.m. of $H_2O$ equivalent. In general, it is preferred to dry the hydrogen stream entering the hydrocarbon conversion zone down to a level of about 10 volume p.p.m. of water or less. This can be conveniently accomplished by contacting the hydrogen stream with a suitable desiccant such as those mentioned above.

In the reforming embodiment, an effluent stream is withdrawn from the reforming zone and passed through a cooling means to a separation zone, typically maintained at about 25 to 100° F. wherein a hydrogen-rich gas is separated from a high octane liquid product, commonly designated as a reformate. Preferably, at least a portion of this hydrogen-rich gas is withdrawn from the separating zone and passed through an adsorption zone containing an adsorbent selective for water. The resultant substantially water-free hydrogen stream is then recycled through suitable compressing means back to the reforming zone. The liquid phase from the separating zone is then typically withdrawn and commonly treated in a fractionating system in order to adjust its butane concentration in order to control front-end volatility of the resulting reformate.

The conditions utilized in the numerous hydrocarbon conversion embodiments of the present invention are those customarily used in the art for the particular reaction or combination of reactions that is to be effected. For instance, alkylaromatic and paraffin isomerization conditions include: a temperature of about 32° F. to about 100° F. and preferably about 75 to about 600° F.; a pressure of atmospheric to about 100 atmospheres; hydrogen to hydrocarbon mole ratio of about 0.5 to about 20:1, and an LHSV (calculated on the basis of equivalent liquid volume of the charge stock contacted with the catalyst per hour divided by the volume of conversion zone containing catalyst) of about 0.2 hr.$^{-1}$ to 10 hr.$^{-1}$ Dehydrogenation conditions include: a temperature of about 700 to about 1250° F., a pressure of about 0.1 to about 10 atmospheres, a liquid hourly space velocity of about 1 to 40 hr.$^{-1}$ and a hydrogen to hydrocarbon mole ratio of about 1:1 to 20:1. Likewise, typically hydrocracking conditions include: a pressure of about 500 p.s.i.g. to about 3000 p.s.i.g.; a temperature of about 400° F. to about 900° F.; an LHSV of about 0.1 hr.$^{-1}$ to about 10 hr.$^{-1}$; and hydrogen circulation rates of about 1000 to 10,000 s.c.f. per barrel of charge.

In the reforming embodiment of the present invention, the pressure utilized is preferably selected in the range of about 50 p.s.i.g. to about 350 p.s.i.g. In fact, it is a singular advantage of the present invention that it allows stable operation at lower pressure than have heretofore been successfully utilized in so-called "continuous" reforming systems (i.e., reforming for periods of about 15 to about 200 or more barrels of charge per pound of catalyst without regeneration). In other words, the catalyst of the present invention allows the operation of a continuous reforming system to be conducted at lower pressure (i.e., 50 to 350 p.s.i.g.) for about the same or better catalyst life before regeneration as has been heretofore realized with conventional catalysts at higher pressures (i.e., 400 to 600 p.s.i.g.).

Similarly, the temperature required for reforming is generally lower than that required for a similar reforming operation using a high quality catalyst of the prior art. This significant and desirable feature of the present invention is a consequence of the selectivity of the catalyst of the present invention for the octane-upgrading reactions that are preferably induced in a typical reforming operation. Hence, the present invention requires a temperature in the range of from about 800° F. to about 1100° F. and preferably about 900° F. to about 1050° F. As is well known to those skilled in the continuous reforming art, the initial selection of the temperature within this broad range is made primarily as a function of the desired octane of the product reformate considering the characteristics of the charge stock and of the catalyst. Ordinarily, the temperature then is thereafter slowly increased during the run to compensate for the inevitable deactivation that occurs to provide a constant octane product. Therefore, it is a feature of the present invention that the rate at which the temperature is increased in order to maintain a constant octane product, is substantially lower for the catalyst of the present invention than for a high quality reforming catalyst which is manufactured in exactly the same manner as the catalyst of the present invention except for the inclusion of the germanium component. Moreover, for the catalyst of the present invention, the $C_5+$ yield loss for a given temperature increase is substantially lower than for a high quality reforming catalyst of the prior art. In addition, hydrogen production is substantially higher.

The reforming embodiment of the present invention also typically utilizes sufficient hydrogen to provide an amount of about 2.0 to about 20 moles of hydrogen per mole of hydrocarbon entering the reforming zone, with excellent results being obtained when about 5 to about 10 moles of hydrogen are used per mole of hydrocarbon. Likewise, the liquid hourly space velocity (LHSV) used in reforming is selected from the range of about 0.1 to about 10.0 hr.$^{-1}$ with a value in the range of about 1.0 to about 5.0 hr.$^{-1}$ being preferred. In fact, it is a feature of the present invention that, for the same severity level, it allows operations to be conducted at higher LHSV than normally can be stably achieved in a continuous reforming process with a high quality reforming catalyst of the prior art. This last feature is of immense economic significance because it allows a continuous reforming process to operate at the same throughput level with less catalyst inventory than that heretofore used with conventional reforming catalysts at no sacrifice in catalyst life before regeneration.

The following examples are given to illustrate further the preparation of the catalytic composite of the present invention and the use thereof in the conversion of hydrocarbons. It is understood that the examples are given for the sole purpose of illustration and are not to be considered to limit unduly the generally broad scope and spirit of the appended claims.

EXAMPLE I

This example demonstrates a preferred method of preparing the preferred catalytic composite of the present invention.

An alumina carrier material comprising 1/16 inch spheres was prepared by: forming an aluminum hydroxyl chloride sol by dissolving substantially pure aluminum pellets in a hydrochloric acid solution, adding hexamethylenetetramine to the resulting sol, getting the resulting solution by dropping it into an oil bath to form spherical particles of alumina hydrogel. The resulting hydrogel particles were then aged and washed with an ammoniacal solution and finally dried and calcined at an elevated temperature to form spherical particles of gamma-alumina containing about 0.3 wt. percent combined chloride. Additional details as to this method of preparing the preferred carrier material are given in the teachings of U.S. Pat. No. 2,620,314.

A measured amount of germanium dioxide crystals was placed in a porcelain boat and subjected to a reduction treatment with substantially pure hydrogen at a temperature of about 650° C. for about 2 hours. The resulting grayish-black solid material was dissolved in chlorine water to form an aqueous solution of germanium mono-oxide. An aqueous solution containing chloroplatinic acid and hydrogen chloride was then prepared. The two solutions were then intimately admixed and used to impregnate the gamma-alumina particles in amounts, respectively, calculated to result in a final composite containing 0.25 wt. percent Ge and 0.375 wt. percent Pt. In order to insure uniform distribution of both metallic components throughout the carrier material, this impregnation step was performed by adding the carrier material particles to the impregnation mixture with constant agitation. In addition, the volume of the solution was two times the volume of the carrier material particles. The impregnation mixture was maintained in contact with the carrier material particles for a period of about ½ hour at a temperature of about 70° F. Thereafter, the temperature of the impregnation mixture was raised to about 225° F. and the excess solution was evaporated in a period of about 1 hour. The resulting dried particles were then subjected to a calcination treatment in an air atmosphere at a temperature of about 925° F. for about 1 hour. The calcined spheres were then contacted with an air stream containing $H_2O$ and HCl in a mole ratio of about 40:1 for about 4 hours at 975° F. in order to adjust the halogen content of the catalyst particles to a value of about 0.90.

The resulting catalyst particles were analyzed and found to contain, on an elemental basis, about 0.375 wt. percent platinum, about 0.25 wt. percent germanium, and about 0.85 wt. percent chloride.

Thereafter, the catalyst particles were subjected to a dry pre-reduction treatment by contacting them with a substantially pure hydrogen stream containing less than 20 vol. p.p.m. $H_2O$ at a temperature of about 1000° F., a pressure slightly above atmospheric and a flow rate of the hydrogen stream through the catalyst particles corresponding to a gas hourly space velocity of about 720 hr.$^{-1}$. This pre-reduction step was for a duration of about 1 hour.

EXAMPLE II

In order to compare the novel catalytic composite of the present invention with those of the prior art in a manner calculated to bring out the interaction between the germanium component and the platinum component, a comparison test was made between the catalyst of the present invention which was prepared according to the method given in Example I and a reforming catalyst of the prior art which contained platinum as its sole hydrogenation-dehydrogenation component. That is to say, the control catalyst was a combination of platinum and chlorine with a gamma-alumina carrier material which was prepared by a manner analogous to that given in Example I except for the inclusion of the germanium component and contained, on an elemental basis, about 0.75 wt. percent platinum and about 0.85 wt. percent chlorine.

These catalysts were then separately subjected to a high stress evaluation test designed to determine their relative activity and selectivity for the reforming of a gasoline charge stock. In all tests the same charge stock was utilized, its characteristics are given in Table I. It is to be noted that this test is conducted under a substantially water-free condition with the only significant source of water being the 5.9 wt. p.p.m. present in the charge stock.

Table I—Analysis of heavy kuwait naphtha

| | |
|---|---|
| API gravity at 60° F. | 60.4 |
| Initial boiling point, ° F. | 184 |
| 10% boiling point, ° F. | 205 |
| 50% boiling point, ° F. | 256 |
| 90% boiling point, ° F. | 321 |
| End boiling point, ° F. | 360 |
| Sulfur, wt. p.p.m. | 0.5 |
| Nitrogen, wt. p.p.m. | 0.1 |
| Aromatic, vol. percent | 8 |
| Paraffins, vol. percent | 71 |
| Naphthenes, vol. percent | 21 |
| Water, p.p.m. | 5.9 |
| Octane No., F-1 clear | 40.0 |

This test was specifically designed to determine in a very short time period whether the catalyst being evaluated has superior characteristics for the reforming process. It consists of six periods comprising a six hour line-out period followed by a ten hour test period run at a constant temperature during which time a $C_5+$ product reformate is collected. It was performed in a laboratory scale reforming plant comprising a reactor containing the catalyst, hydrogen separation zone, a debutanizer column, suitable heating, pumping, and condensing means, etc.

In this plant, a hydrogen recycle stream and the charge stock are commingled and heated to the desired conversion temperature. The resulting mixture is then passed downflow into a reactor containing the catalyst as a fixed bed. An effluent stream is then withdrawn from the bottom of the reactor, cooled to about 55° F., and passed to the separating zone wherein a hydrogen-rich gaseous phase separates from a liquid phase. A portion of the gaseous phase is continuously passed through a high surface area sodium scrubber and the resulting substantially water-free hydrogen stream recycled to the reactor in order to supply hydrogen for the reaction, and the excess over that needed for plant pressure is recovered as excess separator gas. Moreover, the liquid phase from the separating zone is withdrawn therefrom and passed to the debutanizer column wherein light ends are taken overhead as debutanizer gas and a $C_5+$ reformate stream recovered as bottoms.

Conditions utilized in this test are: a constant temperature of about 963° F. for the first three periods followed by a constant temperature of about 997° F. for the last three periods, a liquid hourly space velocity of 3.0, an outlet pressure of the reactor of 100 p.s.i.g., and a mole ratio of hydrogen to hydrocarbon entering the reactor of 10:1.

This two temperature test is designed to quickly and efficiently yield two points on the yield-octane curve for the particular catalysts. The conditions utilized are selected on the basis of experience to yield the maximum amount of information on the capability of the catalyst being tested to respond to a high severity operation.

The results of the separate tests performed on the catalyst of the present invention and the control catalyst are presented for each test period in Table II in terms of inlet temperature to the reactor in ° F., net excess separator gas in standard cubic feet per barrel of charge (s.c.f./bbl.), debutanizer overhead gas in standard cubic feet per barrel, the ratio of the debutanizer gas make to the total gas make, and F-1 clear octane number.

In addition, the respective catalysts were analyzed for carbon content after the completion of test. The results showed that the catalyst of the present invention contained 2.45 wt. percent carbon which was in marked contrast to the 4.17 wt. percent carbon which was found on the control catalyst. These results evidence an additional advantage of the present invention which is the capability to suppress the rate of deposition of carbonaceous materials thereon during the course of the reforming reaction.

TABLE II.—RESULTS OF ACCELERATED REFORMING TESTS

| Period No.: | Temp., °F. | Separator gas, s.c.f./bbl. | Debutanizer gas, s.c.f./bbl. | Debutanizer gas/ total gas ratio | Octane No. F-1 clear |
| --- | --- | --- | --- | --- | --- |
| Catalyst of the present invention (weight percent), 0.375 Pt, 0.25 Ge, and 0.85 Cl | | | | | |
| 1 | 963 | 1,510 | 53 | .034 | 96.3 |
| 2 | 963 | 1,462 | 46 | .030 | 95.1 |
| 3 | 963 | 1,456 | 47 | .031 | 95.0 |
| 4 | 997 | 1,682 | 51 | .029 | 98.6 |
| 5 | 997 | 1,643 | 51 | .030 | 98.5 |
| 6 | 997 | 1,622 | 49 | .029 | 98.2 |
| Control catalyst (weight percent) Pt, and 0.85 Cl | | | | | |
| 1 | 963 | 1,307 | 66 | .048 | 91.4 |
| 2 | 963 | 1,236 | 63 | .049 | 89.5 |
| 3 | 963 | 1,196 | 66 | .052 | 88.9 |
| 4 | 997 | 1,377 | 82 | .056 | 94.0 |
| 5 | 997 | 1,343 | 86 | .060 | 93.3 |
| 6 | 997 | 1,303 | 87 | .062 | 92.3 |

Referring now to the results of the separate tests performed in Table II, it is evident that the effect of the germanium component on the catalyst is to substantially promote the platinum metal component and to enable a catalyst containing less platinum to out-perform a catalyst containing a substantially greater amount of platinum. That is to say, the catalyst of the present invention is sharply superior to the control catalyst in both activity and stability. As was pointed out hereinbefore, a good measure of activity for a reforming catalyst is octane number of reformate produced at the same conditions; on this basis, the catalyst of the present invention was more active than the control catalyst at both temperature conditions. However, activity is only half of the story: activity must be coupled with selectivity to demonstrate superiority. Selectivity is measured directly by reference to $C_5+$ yield and indirectly by reference to separator gas make, which is roughly proportional to net hydrogen make which, in turn, is a product of the preferred upgrading reactions, and by reference to debutanizer gas make which is a rough measure of undesired hydrocracking and should be minimized for a highly selective catalyst. Referring again to the data presented in Table II and using the selectivity criteria, it is manifest that the catalyst of the present invention is materially more selective than the control catalyst.

From consideration of this data, it is clear that germanium is an efficient and effective promoter of a platinum metal reforming catalyst.

EXAMPLE III

In order to compare the stability characteristics of the catalyst of the present invention with the control catalyst, a slightly different comparison test was performed. This test was designed to measure, on an accelerated basis, the stability characteristics of the catalyst being tested in a high severity reforming operation. The compositions of the catalysts employed were identical to those described in Example II.

The test consisted of six periods of 24 hours with a 12 hour line-out period being followed by a 12 hour test period. The conditions employed were: an outlet reactor pressure of 100 p.s.i.g., a liquid hourly space velocity of 1.5 hr.$^{-1}$, a hydrogen to hydrocarbon mole ratio of about 8:1 and an inlet reactor temperature which was continuously adjusted throughout the test in order to achieve and maintain a $C_5+$reformate target octane of 102 F-1 clear. It is to be noted that these are exceptionally severe conditions.

The reforming plant utilized was identical in structure and flow scheme to that described in Example II.

The results of the comparison test are recorded in Table III in terms of temperature required to make octaine, $C_5+$ yield, and debutanizer and separator gas make.

TABLE III.—RESULTS OF HIGH STRESS STABILITY TEST

| Period No.: | Temp., °F. | $C_5+$, vol. percent | Separator gas, s.c.f./bbl. | Debutanizer gas, s.c.f./bbl. |
| --- | --- | --- | --- | --- |
| Catalyst of the present invention (weight percent), 0.375 pt, 0.25 Ge, and 0.85 Cl | | | | |
| 1 | 964 | 77.6 | 1,733 | 60 |
| 2 | 973 | 76.9 | 1,700 | 65 |
| 3 | 981 | 77.2 | 1,790 | 66 |
| 4 | 986 | 77.6 | 1,788 | 63 |
| 5 | 990 | 76.4 | 1,767 | 68 |
| 6 | 994 | 77.0 | 1,773 | 68 |
| Control catalyst (weight percent), 0.75 Pt and 0.85 Cl | | | | |
| 1 | 978 | 69.4 | 1,804 | 110 |
| 2 | 994 | 69.9 | 1,762 | 107 |
| 3 | 1,022 | 69.8 | 1,733 | 111 |
| 4 | 1,045 | 62.5 | 1,703 | 154 |
| 5 | 1,103 | | 1,622 | 237 |
| 6 | | | | |

Referring to Table III, it is evident that the catalyst of the present invention is materially more stable than the control catalyst under the conditions of this comparison test. This stability feature is evident both in the area of temperature stability and yield stability. Even more surprising, $C_5+$ yield for the catalyst of the present invention is consistently above that produced by the control catalyst throughout the test. Therefore, this accelerated stability test provides additional evidence of the synergistic effect of the germanium component on the platinum-containing catalyst.

EXAMPLE IV

In order to study the responses of the catalyst of the present invention to varying conditions in a reforming operation, a sample of the catalyst prepared by the method of Example I was subjected to a four period test in which the pressure, the liquid hourly space velocity, and the conversion temperature were varied in a manner calculated to bring out the responses of the catalyst to changes in pressure and changes in space velocity.

After a line-out period of 12 hours, a four period test was performed. The test periods were of 10 hour duration followed by a 10 hour line-out period, and the conditions used in each period were as follows: for the first period the pressure was 500 p.s.i.g., the liquid hourly space velocity was 1.5 hr.$^{-1}$ and the conversion temperature was 975° F.; for the second period the pressure was 300 p.s.i.g., the liquid hourly space velocity was 1.5 hr.$^{-1}$, and the temperature was 975° F.; for the third period the pressure was 300 p.s.i.g., the liquid hourly space velocity was 3.0 hr.$^{-1}$, and the conversion temperature was 1020° F.; and for the final period the pressure was 100 p.s.i.g., the liquid hourly space velocity was 3.0 hr.$^{-1}$, and the temperature was 1050° F.

The results of this test for the catalyst of the present invention and the control catalyst are presented in Table IV in terms of: octane number of $C_5+$ product, debutanizer gas make in s.c.f./bbl., net separator gas in s.c.f./bbl., and ratio of debutanizer gas make to total gas make.

TABLE IV.—RESULTS OF CONDITION STUDY

| | Temp. °F. | Liquid hourly space velocity hr.$^{-1}$ | Pressure, p.s.i,g. | Debutanizer/total gas ratio | Octane No. F-1 clear | Debutanizer gas, s.c.f./bbl. | Separator gas, s.c.f./bbl.l |
|---|---|---|---|---|---|---|---|
| Catalyst of the present invention (weight percent), 0.375 Pt, 0.25 Ge, 0.85 Cl | | | | | | | |
| Period No.: | | | | | | | |
| 1 | 975 | 1.5 | 500 | .336 | 98.9 | 448 | 888 |
| 2 | 975 | 1.5 | 300 | .164 | 100.0 | 248 | 1,270 |
| 3 | 1,020 | 3.0 | 300 | .145 | 100.0 | 220 | 1,302 |
| 4 | 1,050 | 3.0 | 100 | .028 | 102.0 | 52 | 1,793 |
| Control catalyst (weight percent), 0.75 Pt and 0.85 Cl | | | | | | | |
| 1 | 975 | 1.5 | 500 | .282 | 98.9 | 387 | 985 |
| 2 | 975 | 1.5 | 300 | .151 | 98.8 | 225 | 1,262 |
| 3 | 1,020 | 3.0 | 300 | .155 | 97.9 | 223 | 1,221 |
| 4 | 1,050 | 3.0 | 100 | .087 | 94.9 | 118 | 1,233 |

By reference to the data presented in Table IV, it can be seen that the catalyst of the present invention quite unexpectedly exhibits markedly superior performance at the low pressure conditions utilized. These results stand in sharp contrast to the generally poor performance of the all platinum metal-containing control catalysts.

Accordingly, the catalyst of the present invention in a reforming embodiment finds optimum application at a low pressure condition of about 50 to about 350 p.s.i.g. This superior performance in the low pressure domain is not paralleled by increased performance at high pressure conditions, and this response to the catalyst of the present invention to low pressure conditions is one of the singular and totally unexpected advantages associated with the catalyst of the present invention.

I claim as my invention:

1. A catalytic composite comprising a combination of a platinum group metal, a germanium component, and a halogen component with a porous carrier material, wherein substantially all of said platinum group metal is present as the elemental metal and substantially all of said germanium component is present in an oxidation state above that of the elemental metal, and wherein said components are present amounts sufficient to result in the composite containing, on an elemental basis, about 0.01 to about 2.0 wt. percent of the platinum group metal, about 0.01 to about 5.0 wt. percent of germanium, and about 0.5 to about 3.5 wt. percent halogen.

2. A catalytic composite as defined in claim 1 wherein said platinum group metal is platinum.

3. A catalytic composite as defined in claim 1 wherein said germanium component is germanium oxide or sulfide.

4. A catalytic composite as defined in claim 1 wherein said halogen component is chlorine or a compound of chlorine.

5. A catalytic composite as defined in claim 1 wherein said porous carrier material is a refractory inorganic oxide.

6. A catalytic composite as defined in claim 5 wherein said refractory inorganic oxide is gamma- or eta-alumina.

7. A catalytic composite as defined in claim 1 wherein said composite contains, on an elemental basis, about 0.05 to about 1.0 wt. percent of the platinum group metal, about 0.05 to about 2.0 wt. percent of germanium, and about 0.6 to about 1.2 wt. percent halogen.

8. A catalytic composite as defined in claim 1 wherein the atomic ratio of germanium to the platinum group metal contained in the composite is about 0.1:1 to about 5:1.

9. A catalytic composite comprising a combination of platinum, a germanium oxide component, and a halogen component with an alumina carrier material in amounts sufficient to result in the composite containing, on an elemental basis, about 0.01 to about 2.0 wt. percent platinum, about 0.01 to about 5.0 wt. percent germanium, and about 0.5 to about 3.5 wt. percent halogen, substantially all of said platinum being present as the elemental metal and substantially all of said germanium being present in an oxidation state above that of the elemental metal.

10. A catalytic composite as defined in claim 9 wherein said halogen component is chlorine or a compound of chlorine.

11. A catalytic composite comprising a combination of the catalytic composite of claim 9 with a sulfur component in amounts sufficient to incorporate about 0.05 to about 0.5 wt. percent sulfur, calculated on an elemental basis.

12. A catalytic composite as defined in claim 9 wherein the atomic ratio of germanium to platinum contained in the composite is about 0.1:1 to about 5:1.

13. A catalytic composite as defined in claim 9 wherein said composite contains about 0.05 to about 1.0 wt. percent platinum, about 0.05 to about 2.0 wt. percent germanium, and about 0.6 to about 1.2 wt. percent halogen.

14. A catalytic composite as defined in claim 13 wherein the atomic ratio of germanium to platinum contained in the composite is about 0.2:1 to about 3.5:1.

15. A process for converting a hydrocarbon which comprises contacting the hydrocarbon with the catalytic composite of claim 1 at hydrocarbon conversion conditions.

16. A processes for reforming a gasoline fraction which comprises contacting the gasoline fraction and hydrogen with the catalytic composite of claim 9 at reforming conditions.

17. A process as defined in claim 16 wherein said reforming conditions include a temperature of about 800 to about 1100° F., a pressure of about 50 to about 350 p.s.i.g., a liquid hourly space velocity of about 0.1 to about 10 hr.$^{-1}$, and a mole ratio of hydrogen to hydrocarbon of about 1 to about 20 moles of hydrogen per mole of hydrocarbon.

18. A process as defined in claim 16 wherein said contacting is performed in a substantially water-free environment.

19. A process for reforming a gasoline fraction which comprises contacting the gasoline fraction and hydrogen with the catalytic composite of claim 13 at reforming conditions including a pressure of about 50 to about 350 p.s.i.g.

20. A process as defined in claim 19 wherein said contacting is performed in a substantially water-free environment.

References Cited
UNITED STATES PATENTS

| | | | |
|---|---|---|---|
| 2,784,147 | 3/1957 | Strecker et al. | 252—463 |
| 2,796,410 | 6/1957 | Strecker et al. | 252—466 |
| 2,861,959 | 11/1958 | Thorn et al. | 208—138 |
| 2,906,701 | 9/1959 | Stine et al. | 208—138 |
| 3,502,573 | 3/1970 | Pollitzer et al. | 208—138 |

HERBERT LEVINE, Primary Examiner

U.S. Cl. X.R.

252—441, 442, 466